United States Patent
Liu (10) Patent No.: US 8,550,421 B2
(45) Date of Patent: Oct. 8, 2013

(54) FOLDABLE SUPPORTING STAND FOR A PORTABLE ELECTRONIC DEVICE

(75) Inventor: Sheng-Yu Liu, Taipei (TW)

(73) Assignee: Free-Free Industrial Corp., Taipei (TW)

(*) Notice: Subject to any disclaimer, the term of this patent is extended or adjusted under 35 U.S.C. 154(b) by 217 days.

(21) Appl. No.: 13/177,083

(22) Filed: Jul. 6, 2011

(65) Prior Publication Data
US 2013/0009024 A1 Jan. 10, 2013

(51) Int. Cl.
*A47G 1/24* (2006.01)

(52) U.S. Cl.
USPC ............ 248/455; 248/460; 248/463; 248/165

(58) Field of Classification Search
USPC ................. 248/447, 454, 455, 460, 462, 463, 248/398, 165, 435, 188.6, 188.7, 346.3
See application file for complete search history.

(56) References Cited

U.S. PATENT DOCUMENTS

| | | | | |
|---|---|---|---|---|
| 5,383,634 A | * | 1/1995 | Liao | 248/166 |
| 5,390,885 A | * | 2/1995 | Shen | 248/168 |
| 6,579,017 B2 | * | 6/2003 | Wei | 396/428 |
| 7,503,539 B2 | * | 3/2009 | Knight | 248/448 |
| 7,712,719 B2 | * | 5/2010 | Derry et al. | 248/346.06 |
| D620,941 S | * | 8/2010 | Stacey et al. | D14/447 |
| D636,397 S | * | 4/2011 | Green | D14/447 |
| D638,021 S | * | 5/2011 | Derry | D14/447 |
| 8,020,818 B2 | * | 9/2011 | Chou et al. | 248/176.1 |
| 2002/0088914 A1 | * | 7/2002 | Yu | 248/434 |
| 2005/0029415 A1 | * | 2/2005 | Ma | 248/166 |
| 2009/0140119 A1 | * | 6/2009 | To et al. | 248/455 |
| 2010/0043178 A1 | * | 2/2010 | Reisel et al. | 16/86 R |

* cited by examiner

*Primary Examiner* — Bradley Duckworth
(74) *Attorney, Agent, or Firm* — Hamre, Schumann, Mueller & Larson, P.C.

(57) ABSTRACT

A foldable supporting stand for a portable electronic device includes: a base body having front and rear sides; two front legs adapted to hold the electronic device and coupled to the base body in proximity to the front side, the front legs being foldable to move toward each other, or unfoldable to move away from each other in opposite sideward directions; and a rear leg including a rear leg body that is coupled to the base body in proximity to the rear side and that can be folded to move toward the front legs, or unfolded to move rearward and away from the front legs, and a rear leg extension foldably connected to the rear leg body. The rear leg body defines a receiving space for the rear leg extension to be received therein.

7 Claims, 7 Drawing Sheets

FOLDABLE SUPPORTING STAND FOR A PORTABLE ELECTRONIC DEVICE

BACKGROUND OF THE INVENTION

1. Field of the Invention

This invention relates to a foldable supporting stand, and more particularly to a foldable supporting stand for a portable electronic device, by which an inclination angle of the portable electronic device can be varied.

2. Description of the Related Art

Although a portable electronic device, such as a laptop computer or a tablet PC, can be disposed on a flat table surface, user operation of the electronic device on the table surface is inconvenient. In order to dispose a portable electronic device in a desired orientation, U.S. Pat. No. 7,712,719 discloses a foldable supporting stand, in which a pair of front legs are rotatably coupled to a rear leg, and are adjustable in length. Thus, the portable electronic device can be disposed on the conventional supporting stand to have a desired inclination angle by adjusting the length of the front legs of the supporting stand. However, the structure and the assembly of the conventional supporting stand are relatively complicated.

SUMMARY OF THE INVENTION

Therefore, an object of the present invention is to provide a foldable supporting stand that can overcome the aforesaid drawbacks associated with the prior art.

Accordingly, a foldable supporting stand for a portable electronic device of this invention comprises:

a base body having front and rear sides;

two front legs adapted to hold the electronic device and coupled to the base body in proximity to the front side, the front legs being foldable to move toward each other, or unfoldable to move away from each other in opposite sideward directions; and a rear leg including a rear leg body that is coupled to the base body in proximity to the rear side and that can be folded to move toward the front legs, or unfolded to move rearward and away from the front legs, and a rear leg extension foldably connected to the rear leg body, the rear leg body defining a receiving space for the rear leg extension to be received therein.

The front legs are inclined when the rear leg moves rearward, and an inclination angle of the front legs varies when the rear leg extension changes between a folded configuration, in which the rear leg extension is received in the receiving space, and an unfolded configuration, in which the rear leg extension is moved away from the receiving space.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
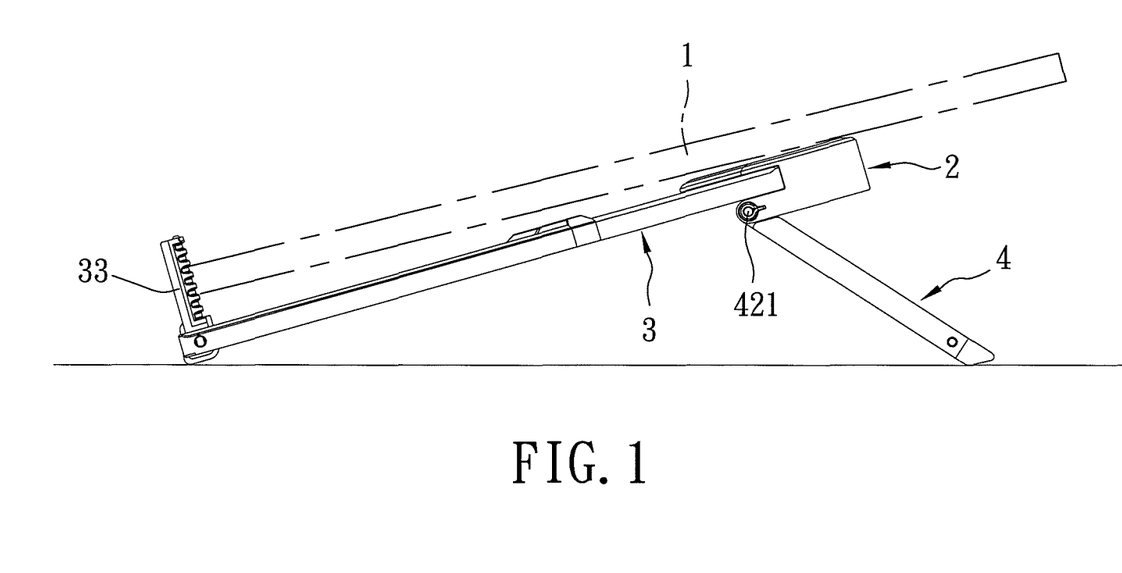
FIG. 1 is a side view of the preferred embodiment of a foldable supporting stand, which is in a use state, according to this invention.
Figure 2:
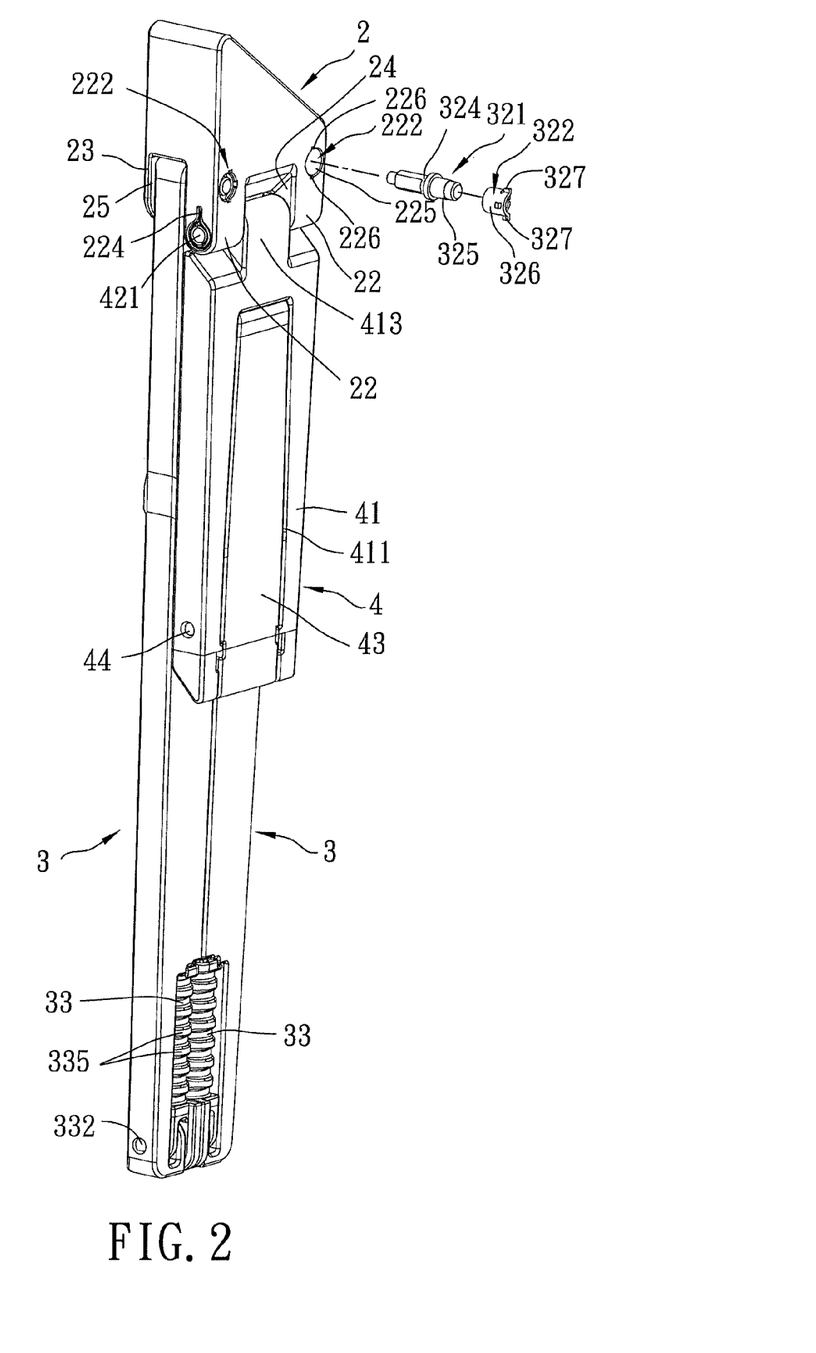
FIG. 2 is a rear view illustrating the foldable supporting stand of FIG. 1 in a folded state.
Figure 3:
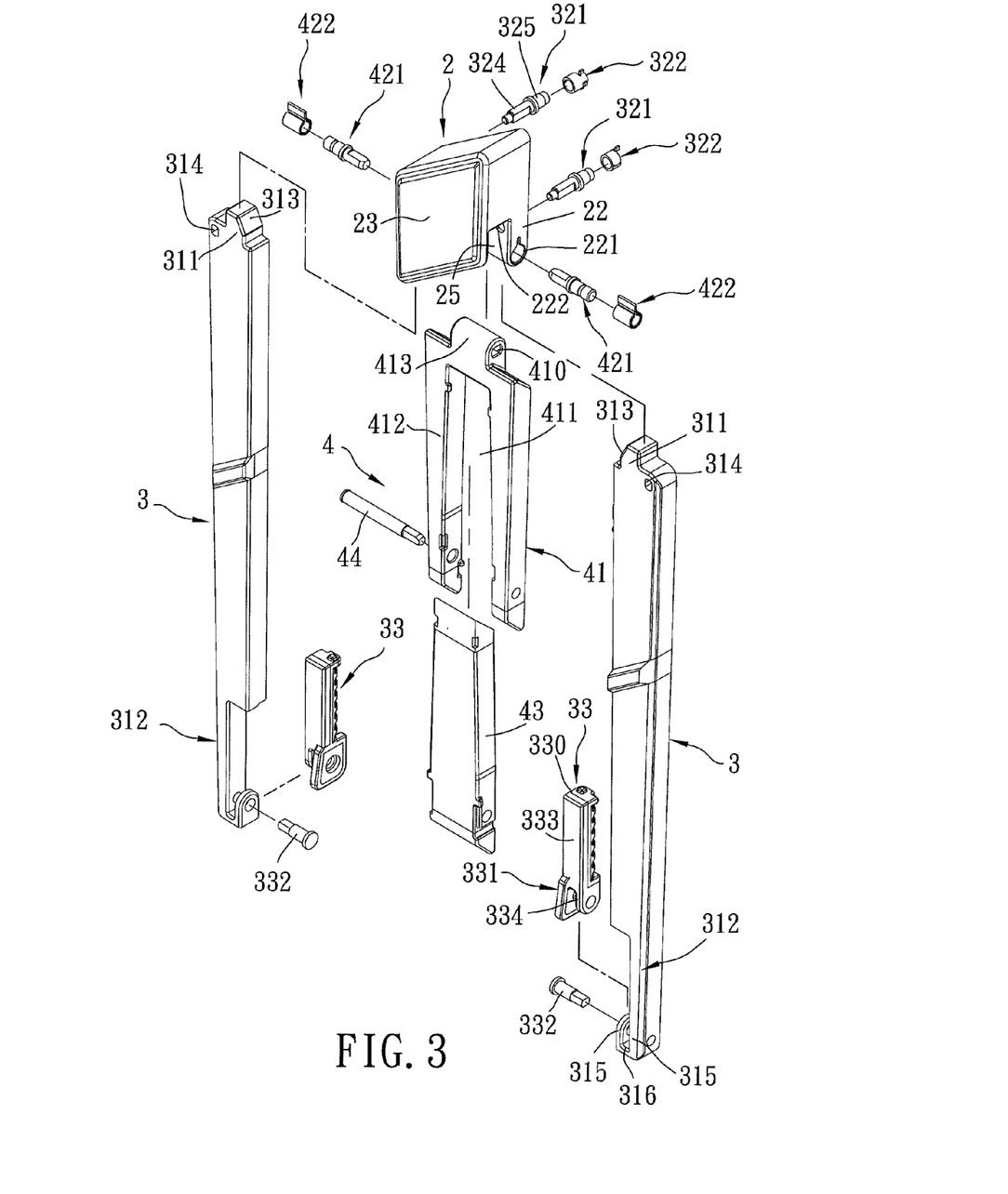
FIG. 3 is an exploded view of the preferred embodiment of this invention.

Referring to FIGS. 1 to 3, the preferred embodiment of a foldable supporting stand according to this invention can be varied between a use state (FIG. 1) and a folded state (FIG. 2). When in the use state, a portable electronic device 1 (for example, a tablet PC) can be inclinedly disposed on the foldable supporting stand, and an inclination angle of the portable electronic device 1 is adjustable through the foldable supporting stand. The foldable supporting stand of this invention comprises: a base body 2, two front legs 3 that are coupled foldably and unfoldably to the base body 2 in proximity to a front side of the base body 2, and a rear leg 4 that is coupled foldably and unfoldably to the base body 2.

Figure 4:
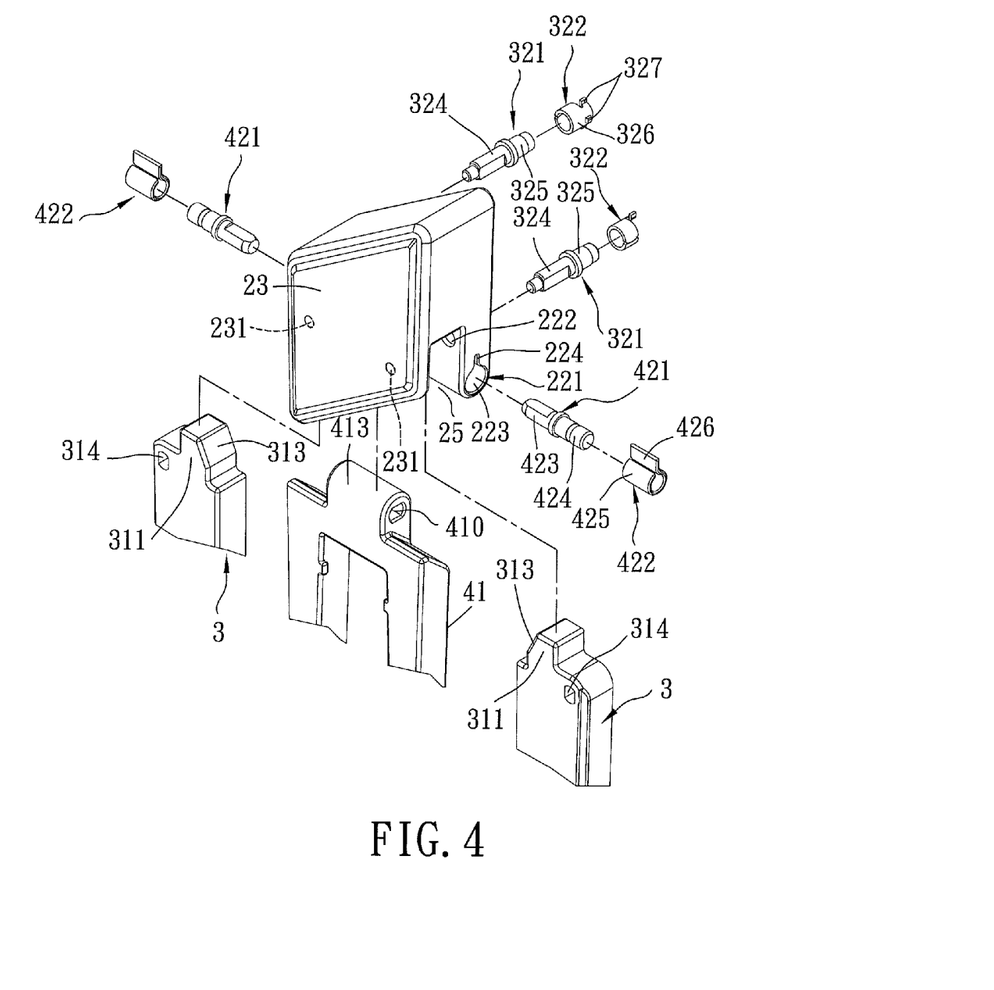
FIG. 4 is a fragmentary enlarged view of FIG. 3 illustrating the relationship among a base body and other elements in the foldable supporting stand.

Referring to FIGS. 2 to 4, the base body 2 has spaced apart left and right pivot parts 22, a front panel 23, a first gap 24, and two second gaps 25 (only one is shown in FIGS. 3 and 4). The front panel 23 is disposed at the front side of the base body 2 and protrudes downwardly. The left and right pivot parts 22 extend downwardly from the base body 2 in proximity to a rear side of the base body 2. As best shown in FIG. 2, the first gap 24 is formed between the left and right pivot parts 22, and opens at the rear side of the base body 2 to receive a rear leg pivot part 413 of the rear leg 4. The rear leg pivot part 413 is pivoted to the left and right pivot parts 22. As best shown in FIG. 4, each of the second gaps 25 is formed between the front panel 23 and one of the left and right pivot parts 22, and opens at one of left and right sides of the base body 2 to receive an upper pivot part 311 of one of the front legs 3. The upper pivot part 311 of each of the front legs 3 is pivoted to one of the left and right pivot parts 22.

Each of the left and right pivot parts 22 includes a first pivot hole 221 extending through the respective pivot part 22 in a left-right direction, and a second pivot hole 222 extending through the respective pivot part 22 in a rear-front direction. As best shown in FIGS. 2 and 4, the first pivot hole 221 in each of the left and right pivot parts 22 includes a circular hole section 223, and a radial hole section 224 extending radially from the circular hole section 223. As best shown in FIG. 2, the second pivot hole 222 in each of the left and right pivot parts 22 includes a circular hole section 225, and a plurality of radial hole sections 226 extending radially from the circular hole section 225. The front panel 23 has two blind holes 231 that are respectively aligned with the second pivot holes 222 of the left and right pivot parts 22 (see FIG. 4).

The front legs 3 are adapted to hold the electronic device 1 (see FIG. 1), and are foldable to move toward each other, or unfoldable to move away from each other in opposite sideward directions. Each of the front legs 3 includes a lower end 312 opposite to the upper pivot part 311, a stopper 33 connected to the lower end 312, a second pivot shaft 321, and a resilient second sleeve member 322.

The upper pivot part 311 of each front leg 3 extends into one of the second gap 25 of the base body 2, and includes an abutting face 313 that faces another abutting face 313 of the adjacent front leg 3 to limit an unfolding degree of the front legs 3, and a non-circular pivot hole 314 that extends through the respective upper pivot part 311 in the rear-front direction.

The lower end 312 of each front leg 3 has a substantially U-shape, and includes two substantially parallel plate sections 315 having different lengths, and a bottom plate section 316 interconnecting bottom ends of the parallel plate sections 315.

The second pivot shaft 321 of each front leg 3 extends into the respective second pivot hole 222, the respective pivot hole 314 and the respective blind hole 231, and has a front portion 324 inserted in the respective non-circular pivot hole 314 to engage the upper pivot part 311 of the respective front leg 3 for co-rotation, and a rear portion 325 opposite to the front portion 324.

The resilient second sleeve member 322 of each front leg 3 is sleeved on the rear portion 325 of the respective second pivot shaft 321, and is inserted non-rotatably in the base body 2. The second sleeve member 322 of each front leg 3 grips resiliently the respective second pivot shaft 321 to limit the second pivot shaft 321 from rotation when no external force is exerted on the second pivot shaft 321. As best shown in FIGS. 2 and 4, each second sleeve member 322 has a substantially C-shaped cross section 326 disposed within the circular hole section 225 of the respective second pivot hole 222, and a plurality of radial projections 327 respectively extending into the radial hole sections 226 of the respective second pivot hole 222 to restrict rotation of the second sleeve member 322.

The stopper 33 of each front leg 3 includes a folding arm 333 that has a bottom pivot part 331 received between the parallel plate sections 315, a pivot pin 332 connecting pivotally the bottom pivot part 331 to the parallel plate sections 315, a top free end 330 (see FIG. 3), and a plurality of anti-slip grooves 335 (see FIG. 2) that are disposed between the top free end 330 and the bottom pivot part 331 and that are formed from an anti-slip material. The bottom pivot part 331 of each front leg 3 has an abutment face 334 abutting against the bottom plate section 316 when the folding arm 333 is unfolded.

Figure 5:
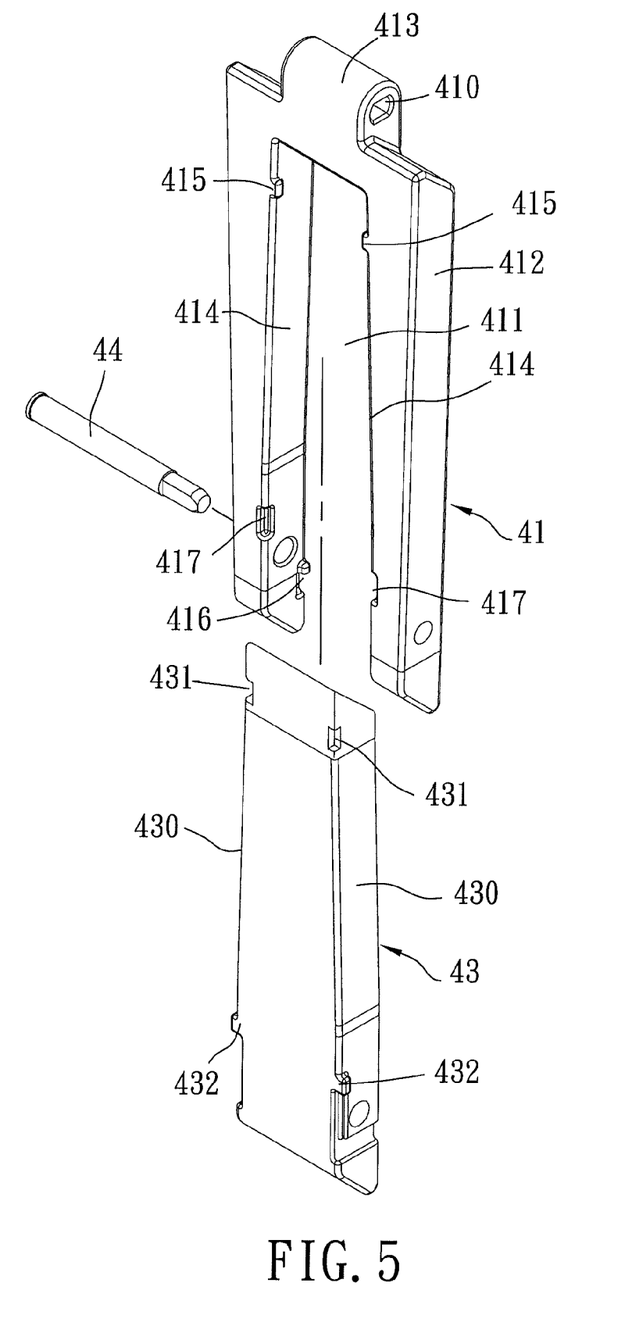
FIG. 5 is a fragmentary enlarged view of FIG. 3 illustrating a rear leg in the foldable supporting stand.

The rear leg 4 includes a rear leg body 41, a rear leg extension 43, and a rear leg pivot shaft 44. The rear leg body 41 is coupled to the base body 2 in proximity to the rear side, and can be folded to move toward the front legs 3, or unfolded to move rearward and away from the front legs 3. By extension of the rear leg pivot shaft 44 into the rear leg body 41 and the rear leg extension 43, the rear leg extension 43 is foldably connected to the rear leg body 41. The rear leg body 41 includes a substantially U-shaped frame 412 defining a receiving space 411, and the rear leg pivot part 413 has a rear pivot hole 410 and is pivotally connected between the left and right pivot parts 22 of the base body 2. As best shown in FIG. 5, the frame 412 includes two spaced apart inner walls 414 bounding the receiving space 411, two wall protrusions 415 respectively protruding into the receiving space 411 from the two inner walls 411 at an upper front side of the rear leg body 41, two wall recesses 417 respectively indented from the two inner walls 411 at a lower front side of the rear leg body 41, and two wall recesses 416 respectively indented from the two inner walls 411 at a lower rear side of the rear leg body 41. The rear leg extension 43 can be received in the receiving space 411.

In this preferred embodiment, the rear leg 4 further includes two first pivot shafts 421 and two resilient first sleeve members 422. As best shown in FIG. 4, each first pivot shaft 421 extends into the respective first pivot hole 221 and the rear pivot hole 410 of the rear leg pivot part 413, and includes a non-circular inner portion 423 inserted into the rear pivot hole 410 for co-rotation with the rear leg body 41, and a circular outer portion 424 connected to the inner portion 423.

Each first sleeve member 422 is sleeved on the outer portion 424 of the respective first pivot shaft 421, and is inserted non-rotatably in the base body 2. Each first sleeve member 422 grips resiliently the respective first pivot shaft 421 to limit the respective first pivot shaft 421 from rotation when no external force is exerted on the first pivot shaft 421. As best shown in FIG. 4, each first sleeve member 422 has a substantially C-shaped cross section 425 disposed within the respective circular hole section 223, and a radial projection 426 extending into the respective radial hole section 224 to restrict rotation of the first sleeve member 422.

Figure 7:
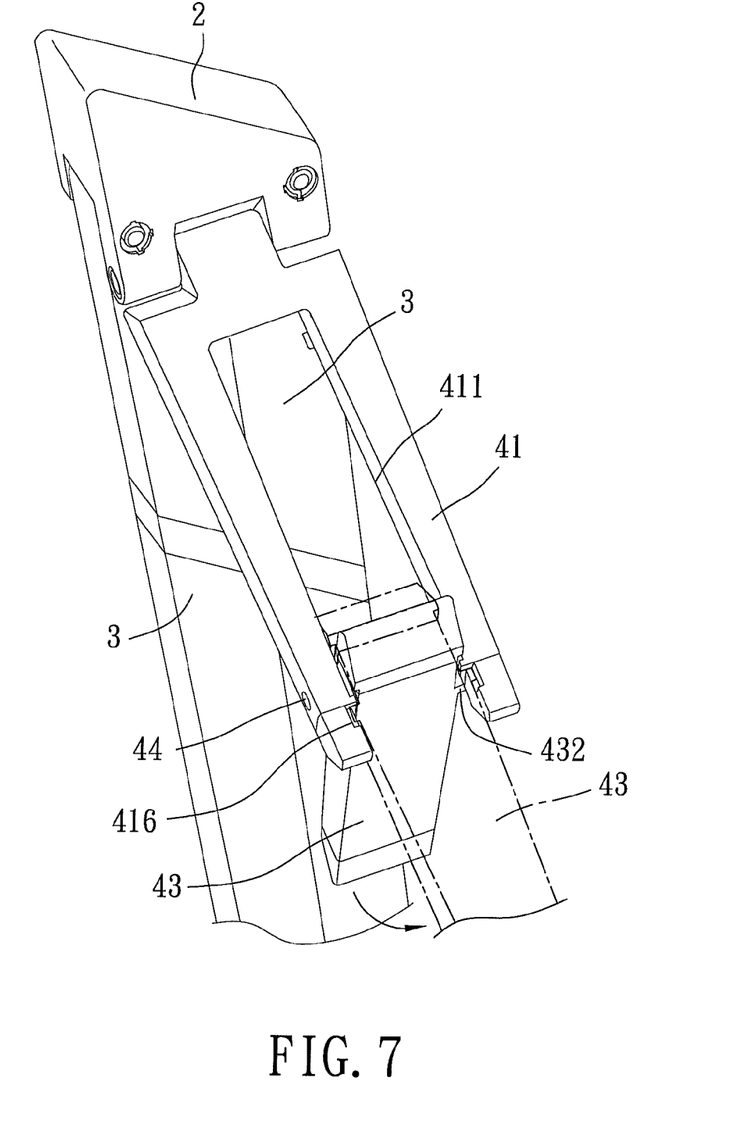
FIG. 7 is a fragmentary rear view illustrating how the rear leg extension is unfolded.

The rear leg extension 43 is coupled foldably and unfoldably to the rear leg body 41, and has two outer sidewalls 430, two sidewall protrusions 432 respectively protruding from the two outer sidewalls 430, and two sidewall recesses 431 indented from the outer sidewalls 430 (see FIG. 5). When the rear leg extension 43 is received in the receiving space 411 (i.e., the rear leg extension 43 is in a folded configuration), the two outer sidewalls 430 respectively face the two inner walls 414, the two sidewall protrusions 432 respectively engage the wall recesses 417, and the two sidewall recesses 431 respectively engage the wall protrusions 415. The U-shaped frame 412 of the rear leg body 41 is slightly deformable to receive the rear leg extension 43. When the rear leg extension 43 is rotated together with the rear leg pivot shaft 44 to be fully unfolded, the two sidewall protrusions 432 respectively engage the wall recesses 416 (FIG. 7), and the rear leg body 41 and the rear leg extension 43 extend along a straight line.

Referring to FIGS. 1, 3, and 5, when using the foldable supporting stand of this invention, the two front legs 3 are unfolded to move away from each other in opposite sideward directions, and are rotated together with the respective second pivot shafts 321. Because the second sleeve member 322 of each front leg 3 grips resiliently the respective second pivot shaft 321, the front legs 3 can be retained in any desired inclined position. However, when the abutting faces 313 of the front legs 3 are abutted against each other, the front legs 3 cannot be further unfolded. After the front legs 3 are unfolded, the folding arm 331 of each stopper 33 is unfolded until the respective abutment face 334 abuts against the respective bottom plate section 316. At this time, the unfolding of the front legs 3 is completed.

Figure 6:
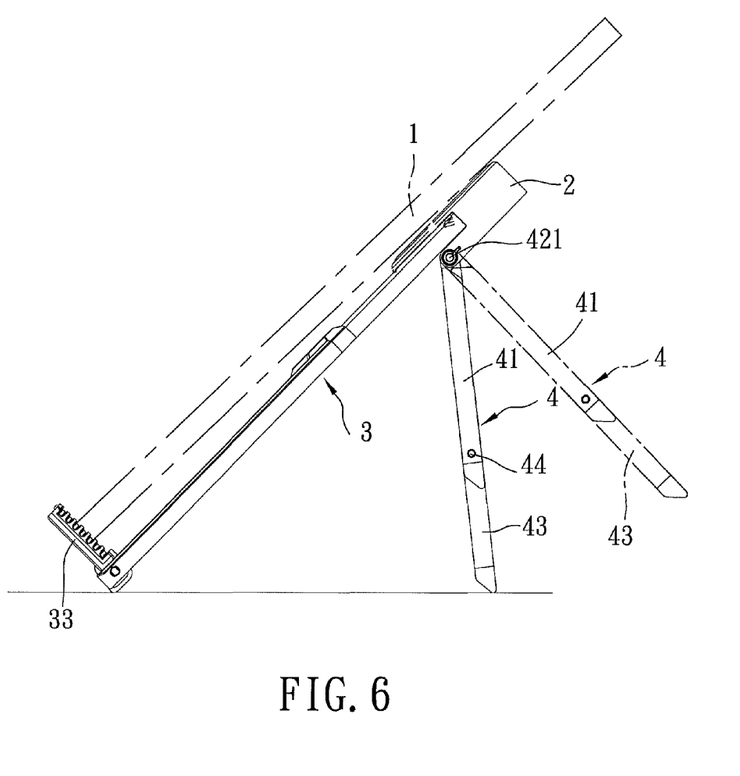
FIG. 6 is a view similar to FIG. 1 but illustrating a rear leg extension of the rear leg in an unfolded configuration.

When unfolding the rear leg body 41, the rear leg body 41 is rotated rearward together with the first pivot shafts 421, and the front legs 3 are inclined. Because the inner portion 423 of each first pivot shaft 421 co-rotates with the rear leg body 41, and because the first sleeve member 422 sleeved on the outer portion 424 of the respective first pivot shaft 421 is inserted non-rotatably in the base body 2, the rear leg body 41 can be retained at any desired inclined position. However, when the rear leg pivot part 413 moves to abut against a surface between the left and right pivot parts 22 (see FIG. 2), the rear leg body 41 cannot be further unfolded. When the portable electronic device 1 is disposed on the stoppers 33, a back side thereof rests on the base body 2 (see FIG. 6). Based on requirement, a bottom of the portable electronic device 1 can be placed on the anti-slip grooves 335 at a selected location to adjust an inclined degree of the portable electronic device 1.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A foldable supporting stand for a portable electronic device, comprising:

a base body having front and rear sides;
two front legs adapted to hold the electronic device and coupled to said base body in proximity to said front side, said front legs being foldable to move toward each other, or unfoldable to move away from each other in opposite sideward directions; and
a rear leg including a rear leg body that is coupled to said base body in proximity to said rear side and that can be folded to move toward said front legs, or unfolded to move rearward and away from said front legs, and a rear leg extension foldably connected to said rear leg body, said rear leg body defining a receiving space for said rear leg extension to be received therein,
wherein said front legs are inclined when said rear leg moves rearward, and an inclination angle of said front legs varies when said rear leg extension changes between a folded configuration , in which said rear leg extension is received in said receiving space, and an unfolded configuration, in which said rear leg extension is moved away from said receiving space,
wherein said rear leg body includes a frame defining said receiving space, and a rear leg pivot part pivotally connected to said base body, and
wherein said base body has:
a first pivot shaft extending into said base body and said rear leg pivot part and engaging said rear leg pivot part for co-rotation, and
a resilient first sleeve member sleeved around said first pivot shaft and inserted non-rotatably in said base body, said first sleeve member gripping resiliently said first pivot shaft to limit said first pivot shaft from rotation when no external force is exerted on said first pivot shaft.

2. The foldable supporting stand of claim 1, wherein each of said front legs includes:
an upper pivot part;
a lower end that is opposite to said upper pivot part;
a stopper connected to said lower end;
a second pivot shaft extending into said base body and said upper pivot part, said second pivot shaft being engaged with said upper pivot part of co-rotation; and
a resilient second sleeve member sleeved around said second pivot shaft and inserted non-rotatably in said base body, said second sleeve member gripping resiliently said second pivot shaft to limit said second pivot shaft from rotation when no external force is exerted on said second pivot shaft.

3. The foldable supporting stand of claim 2, wherein said lower end of each of said front legs has a substantially U-shape, and includes two substantially parallel plate sections, and a bottom plate section interconnecting bottom ends of said parallel plate sections, said stopper including a folding arm that has a bottom pivot part received between said parallel plate sections, a pivot pin connecting pivotally said bottom pivot part to said parallel plate sections, a top free end, and a plurality of anti-slip grooves disposed between said top free end and said bottom pivot part, said bottom pivot part having an abutment face abutting against said bottom plate section when said folding arm is unfolded.

4. The foldable supporting stand of claim 1, wherein said frame includes two spaced apart inner walls bounding said receiving space, two wall protrusions respectively protruding into said receiving space from said two inner walls, and two wall recesses respectively indented from said two inner walls; and
wherein said rear leg extension includes two outer sidewalls to respectively face said two inner walls when said rear leg extension is received in said receiving space, two sidewall protrusions respectively protruding from said two outer sidewalls to respectively engage said wall recesses, and two sidewall recesses indented from said outer sidewalls to respectively engage said wall protrusions.

5. The foldable supporting stand of claim 2, wherein:
each of said first and second pivot holes includes a circular hole section, and a radial hole section extending radially from said circular hole section; and
each of said first and second sleeve members has a substantially C-shaped cross section disposed within said circular hole section, and a radial projection extending into said radial hole section to restrict rotation of said first or second sleeve member.

6. A foldable supporting stand for a portable electronic device, comprising:
a base body having front and rear sides;
two front legs adapted to hold the electronic device and coupled to said base body in proximity to said front side, said front legs being foldable to move toward each other, or unfoldable to move away from each other in opposite sideward directions; and
a rear leg including a rear leg body that is coupled to said base body in proximity to said rear side and that can be folded to move toward said front legs, or unfolded to move rearward and away from said front legs, and a rear leg extension foldably connected to said rear leg body, said rear leg body defining a receiving space for said rear leg extension to be received therein,
wherein said front legs are inclined when said rear leg moves rearward, and an inclination angle of said front legs varies when said rear leg extension changes between a folded configuration , in which said rear leg extension is received in said receiving space, and an unfolded configuration, in which said rear leg extension is moved away from said receiving space, and
wherein said base body further has a front panel disposed at said front side, left and right spaced apart pivot parts extending downwardly from said base body in proximity to said rear side, a first gap that is formed between said left and right pivot parts and that opens at said rear side of said base body to receive a part of said rear leg, and two second gaps each of which is formed between said front panel and one of said left and right pivot parts and each of which opens at one of left and right sides of said base body to receive a part of one of said front legs, said part of said rear leg being pivoted to said left and right pivot parts, said part of each of said front legs being pivoted to one of said left and right pivot parts.

7. The foldable supporting stand of claim 6, wherein said base body further has a first pivot hole extending through at least one of said left and right pivot parts, a first pivot shaft extending into said first pivot hole and said part of said rear leg, two second pivot holes each extending through one of said left and right pivot parts, and two second pivot shaft each extending through one of said second pivot holes and one of said parts of said front legs.

* * * * *